Patented Nov. 2, 1926.

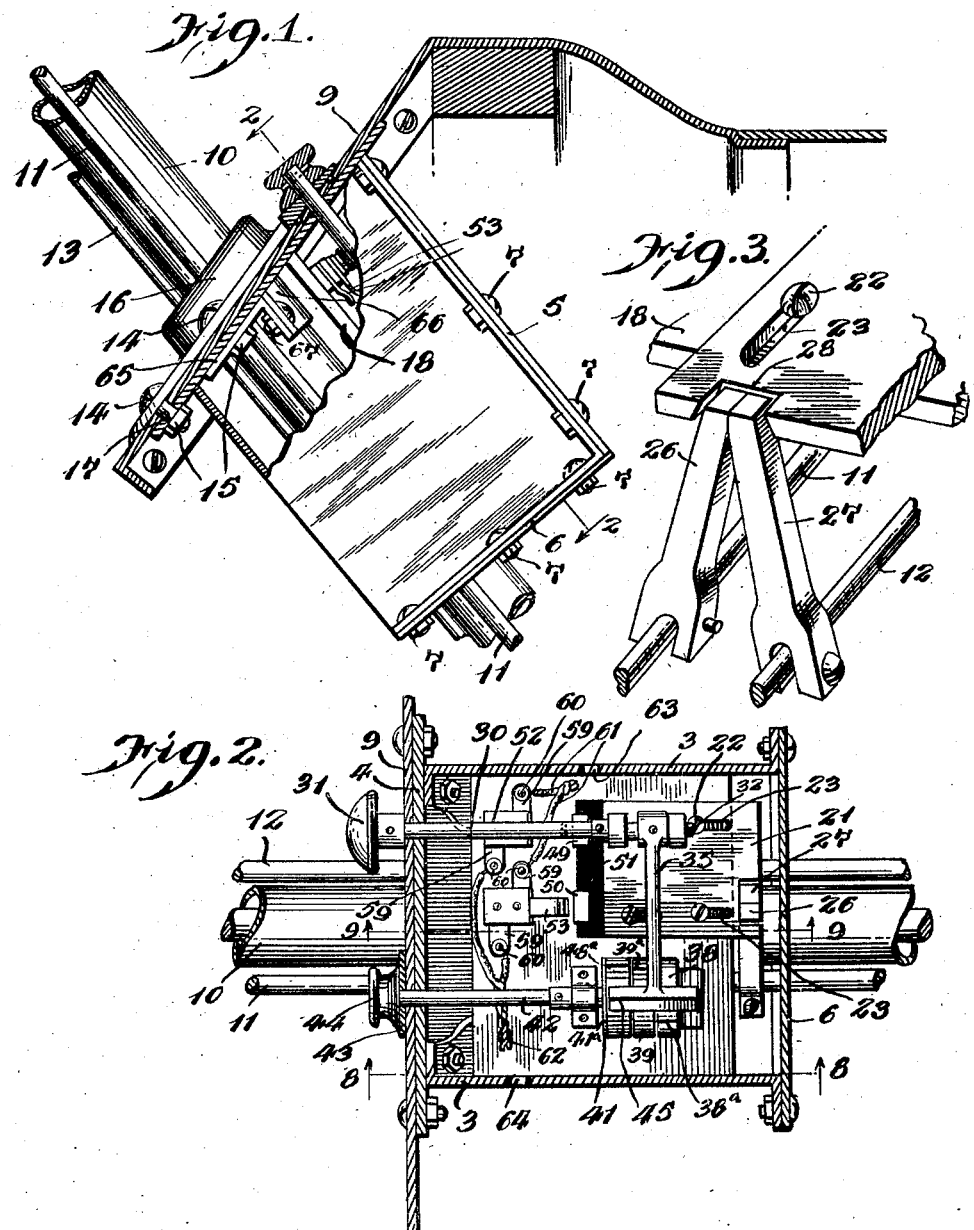

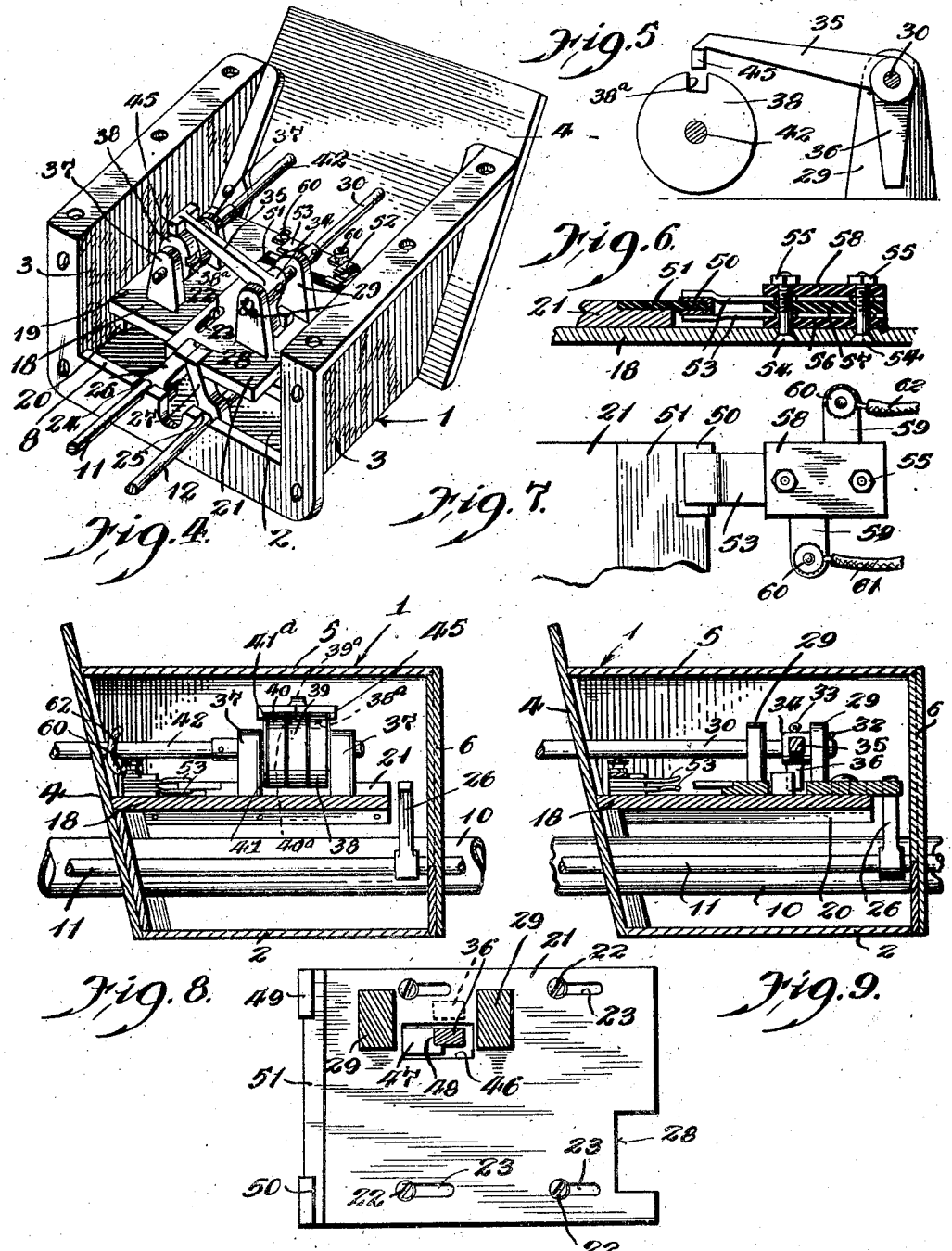

1,605,762

UNITED STATES PATENT OFFICE.

ANDREW NORBERG AND LOUIS B. LODMELL, OF BOWBELLS, NORTH DAKOTA.

AUTOMOBILE LOCK.

Application filed August 11, 1925. Serial No. 49,586.

Our invention relates to improvements in automobile locks, and it consists in the combinations, constructions and arrangements herein described and claimed.

An object of the invention is the provision of a locking device which is adapted to be associated with the steering column and dash board of an automobile and affords facilities for maintaining the ignition circuit of the automobile open and for releasably holding the spark and the fuel throttle control rods of the automobile against movement from positions to prevent starting of the engine of the automobile at the will of the operator of the automobile, whereby the engine of the automobile cannot be operated by an unauthorized person so long as the device is intact and in locking position and the engine of the automobile cannot be started without considerable work and difficulty should the device be broken as a result of violent action by an unauthorized person.

A further object of the invention is the provision of a device of the character described which can be operated to lock control parts of the automobile in neutral or inoperative position or to release said control parts, as desired, without the use of a key or like tool.

A still further object of the invention is the provision of a device of the character described which can be operated conveniently from the driver's seat of an automobile but which comprises locking means supported beneath the hood of the automobile and thus protected against accidental injury and also practically protected against violent action on the part of an unauthorized person who intends to make use of the automobile.

Other objects and advantages of the invention will be apparent from the following description, considered in conjunction with the accompanying drawings, in which—

Figure 1 is a fragmentary view, mainly in vertical section and partly in side elevation, showing the improved locking device applied to the dash board and in association with the steering column of an automobile, Figure 2 is a section substantially along the line 2—2 of Figure 1, Figure 3 is a fragmentary perspective view showing the means for releasably holding the spark and throttle control rods of the automobile against turning about their respective axes from neutral positions, Figure 4 is a perspective view showing the body of the case of the device with the top and front end covers of the case omitted to reveal parts of the device which are housed within the case.

Figure 5 is a sectional elevation of certain of the cooperative elements of the locking mechanism of the device.

Figure 6 is a vertical section through a switch which is comprised in the device.

Figure 7 is a plan view of the structure exhibited in Figure 6.

Figure 8 is a longitudinal vertical section through the device taken on a plane indicated by the line 8—8 on Figure 2.

Figure 9 is a longitudinal vertical section through the device taken on a plane indicated by the line 9—9 on Figure 2.

Figure 10 is a sectional plan view of a slide plate which is comprised in the device together with certain of the elements which are associated with said slide plate.

The improved locking device includes a case generally designated 1 which comprises a body portion consisting of a bottom 2, a pair of side walls 3 and an inclined rear end wall 4. The side walls 3 and the front end portion of the bottom wall 2 may be flanged as shown to afford firm supporting surfaces for a removable top cover 5 and a front end cover 6 which may be secured detachably to the body of the case by bolts and nuts 7 or like fastening devices, the bolts extending through aligned openings in the flanges on the body of the case and the covers.

It may be observed at this point that the flange on the front edge portion of the bottom 2 extends above the level of the upper surface of the bottom 2, as indicated at 8 for a purpose to be presently described.

The rear end 4 of the case of the device fits flatwise against the inner face of the dash board 9 of an automobile and has openings through which the steering post 10, a fuel throttle control rod 11, a spark control rod 12 and the usual tubular conduit 13 for wires at the lower side of a steering post extend.

The body of the lock case may be secured to the dash board 9 by the same bolts 14 and nuts 15 which are used to secure the collar 16 of the steering column to the dash board, the bolts 14 extending through openings, as at 17, in the rear end wall 4 of the body of the case 1.

A supporting plate 18 is secured in place in the case 1 in spaced parallel relation to the bottom 2, as by having the side edge portion thereof fastened by nails, as at 19, or like fastening devices to supporting strips, as at 20, which in turn are secured to the side walls of the case. The supporting plate 18 terminates at its front edge short of the plane of the front end of the case.

A slide plate 21 is movable longitudinally of the case on a portion of the supporting plate 18, the movement of the plate 21 on the supporting plate being guided and limited by stop screws 22 which have the shanks thereof extended through guide slots 23 in the slide plate 21 and secured in the supporting plate 18. The fuel throttle control rod 11 and the spark control rod 12 extends through the case longitudinally thereof below the supporting plate 18 and have bearings, as indicated at 24 and 25 respectively in the upstanding portion of the flange on the front edge of the bottom 2 of the case, such bearings being shown as notches in the upper edge of the upstanding portion 8 of said flange. Latch arms or lugs 26 and 27 respectively are secured to the rods 11 and 12 for swinging movement with the rods about the axes of the rods 11 and 12 in a vertical plane which extends between the front edge of the supporting plate 18 and the flange at the front edge of the bottom 2. When the rods 11 and 12 have been turned to positions to retard the spark to inoperative position and to close the fuel throttle, the upper ends of the latch arms 26 and 27 will be in contact with each other and will be in position to enter a notch or cut out 28 in the front end of the slide plate 21 when the slide plate has been moved on the supporting plate 18 to the limit of its possible movement in a forward direction as best seen in Figures 2 and 4. The fuel throttle and spark control rods 11 and 12 then will be held against rotation about their respective axes until the slide plate 21 has been moved rearwardly on the supporting plate 18 to position to disengage the locking arms 26 and 27 as shown in Figure 8.

The slide plate 21 is formed with a pair of upstanding ears 29 which are spaced longitudinally of the slide plate and are provided with aligned openings for the reception of the forward end portion of a rotatable rod 30 which extends loosely through aligned openings in the rear end 4 of the case 1 and the dash board 9 and is provided at its rearward end with a knob or handle 31. While the rod 30 is slidable and rotatable in the aligned openings in the rear end 4 of the case 1 and the dash board 9, it is prevented from moving axially independently of the slide plate 21 in any suitable known manner, as by means of a cotter pin 32 which extends through the rod 30 at the forward side of the forward lug 29 and a cotter pin 33 which secures the hub 34 of an angular lock bolt on the rod 30 in contact with the rear face of the forward ear 29. The lock bolt just mentioned has the form of a bell-crank and comprises a laterally extending arm 35 and a second arm 36 which depends from the hub 34 between the ears 29 nearly to the plane of the upper face of the slide plate 21.

The arm 35 of the lock bolt extends laterally of the slide plate 21 above the portion of the supporting plate 18 which carries a pair of upstanding ears 37 which are spaced longitudinally of the supporting plate. A series of axially aligned tumblers such as indicated at 38, 39, 40 and 41 respectively are supported between the ears 37 on a tumbler operating rod 42. The rod 42 has the forward end portion thereof journaled in aligned openings in the ears 37 and the rearward end portion of the rod 42 extends through aligned openings in the rear end wall 4 of the case 1 and the dash board 9 and is provided at its rearward end with a dial 43 having a knob portion 44. It will be understood that the respective tumblers may be connected with one another and with the tumbler operating rod 42 in any suitable known manner so that the knob 44 can be grasped and manipulated to turn the rod 42 to position various graduations on the dial 43 in register with an index mark, not shown, on the dash board 9 selectively according to a definite plan and as required to rotate the tumblers sequentially until the transverse notches indicated at 38$^a$, 39$^a$, 40$^a$ and 41$^a$ in the periphery of the tumblers 38, 39, 40 and 41 respectively are in alignment with one another and in position to receive a detent lug 45 which is provided at the free end of the arm 35 of the lock bolt. We therefore have not attempted to show any specific motion transmitting means between the respective tumblers and between the tumblers and the tumbler operating rod 42 since such motion transmitting means are well known in the art to which permutation locks belong.

When the detent lug 45 enters the aligned notches in the peripheries of the tumblers on the rod 42, the lower end portion of the arm 36 of the lock bolt will have been swung to position at one side of an aperture 46 in the slide plate 21 as indicated by the dotted lines in Figure 10 and will be located at one side of a post 47 which is upstanding from the supporting plate 18 through the aperture 46 and is formed with a rabbet 48 or like vertical cut out in the corner portion thereof which is proximate to the lower end portion of the arm 36 of the lock bolt. The knob or handle 31 then may be grasped and the rod 30 may be pulled rearwardly until the slide plate 21 disengages the latching arms 26 and 27 on the fuel throttle control rod 11 and the spark control rod 12, respectively, and until a pair of spaced contacts 49 and 50 respectively which are mounted on an insulating strip 51 on the rearward end portion of the slide plate 21 are in engagement with pairs of vertically spaced and insulatingly spaced contacts 52—52 and 53—53 respectively. Each pair of spring contacts 52—52 and 53—53 is secured to the supporting plate 18 by suitable fastening devices, such as the bolt 54 best seen in Figure 6 and the nuts 55, a layer of insulation 56 being placed between the lower contacts 52 or 53 and the supporting plate 18, a second layer of insulation as at 57 being placed between the respective contacts 52—52 or 53—53, and a third layer of insulation, as at 58, being superimposed on the upper contact 52 or 53. The bolts 54 fit tightly in the openings through the layers of insulation 56, 57 and 58 and are spaced from the walls of the openings in the contacts 52—52 or 53—53 through which they extend so that the respective contacts 52—52 or 53—53 of each pair are insulated from each other as well as from the supporting plate 18. The contacts 52—52 and 53—53 have laterally extending arms, as at 59, each of which is provided with a binding post, as at 60. The binding post 60 of the arm 59 of one of the contacts 52 and the binding post 60 of the arm 59 of the corresponding contact 53 are attached to electrical connecting wires 61. The binding post 60 and the arm 59 of the remaining contact 52 and the binding post 60 and the arm 59 of the remaining contact 53 are attached to electrical conducting wires 62. The wires 61 may extend through an opening 63 in the adjacent side wall 3 of the case 1 and are adapted for connection with opposite sides of a battery which is comprised in the ignition system of the automobile to which the device is applied. The wires 62 extend through an opening 64 in the opposite side wall 3 of the case 1 and are adapted for connection with opposite ends of the coil of the magneto of the automobile.

From the foregoing description of the various parts of the device, the operation thereof may be readily understood. When the detent lug 45 is partially received in the aligned notches in the peripheries of the tumblers on the rod 42, the slide plate 21 can be slid on the supporting plate 18 longitudinally of the casing 1 as a result of actuation of the rod 30. When the slide plate is at the limit of its possible movement in the case 1 in a rearward direction or toward the dash board, the respective contacts 52—52 and 53—53 will be bridged by the contacts 49 and 50, respectively, and the switch which is comprised of the pairs of contacts 52—52, 53—53 and the contacts 49 and 50, will be closed. This switch is included in the ignition circuit of the automobile and the ignition circuit therefore may be closed at this time. The lower end of the arm 36 of the lock bolt is close to the adjacent side of the post 47 when the slide plate 21 is at the limit of its movement in a rearward direction in the case 1, thus precluding turning of the rod 30 about its axis in the direction required to raise the detent lug 45 completely from the aligned notches in the peripheries of the tumblers. The latch arms 26 and 27 on the fuel throttle control rod 11 and the spark control rod 12, respectively, are out of engagement with the notch 28 in the front edge of the slide plate when the slide plate is at the limit of its rearward movement in the case 1 and therefore operation of the fuel throttle control rod and the spark control rod by the driver of the automobile in the usual manner is permitted. When it is desired to lock the automobile so that an unauthorized person is practically prevented from using it, the rod 30 is pushed forward until the slide plate 21 has been moved from the limit of its rearward movement in the case 1 as indicated in Figure 8 to the limit of its forward movement in the case 1 as clearly shown in Figs. 2 and 4. Since the forward movement of the slide plate is effected after the engine of the automobile has stopped, it will be understood that the latch arms 26 and 27 on the fuel throttle rod 11 and the spark control rod 12, respectively, will be in position to engage adjacent to the upper ends with the notch 28 when the slide plate 21 is shoved forward in the case 1. The movable contacts 50 and 49 will be moved out of contact with the pairs of spring contacts 53—53 and 52—52 when the slide plate 21 is moved forward in the case. When the slide plate has reached the limit of its forward movement in the case 1, the rod 30 may be turned about its axis to raise the detent lug 45 completely from the aligned notches in the tumblers and to swing the lower end portion of the arm 36 of the lock bolt into the rabbet or cutaway 48 in the adjacent front corner portion of the post 47. The rod 42 then may be turned as required to disalign the notches in the peripheries of the tumblers and the engagement of the detent lug 45 with the peripheral surfaces of the tumblers then will prevent such movement of the lock bolt about the axis of the rod 30 as would be required to permit the lower end portion of the arm 36 to swing out of the rabbet 48 in the post 47. Rearward movement of the slide plate 21 therefore will be prevented until the rod 42 has been manipulated according to a known combination to effect such relative turning movements of the respective tumblers as may be required to align the notches in the peripheries of the tumblers with one another and to position these notches as required to receive the lower edge portion of the detent lug 45 when the arms 35 of the lock bolt is swung downward about the axis of the rod 30. Therefore, not only will the ignition circuit become broken when the slide plate 21 is at the limit of its forward movement in the case 1 and the notches in the peripheries of the tumblers are out of alignment and out of position to receive the lower edge portion of the detent lug 45 but the fuel throttle control rod 11 and the spark control rod 12 will be held against turning movements from the positions required to hold the fuel throttle closed and the spark retarded to inoperative position. The slide plate 21 therefore may be termed a combined latch plate and switch plate and the rod 30 is an operating rod for both the lock bolt and the combined latch and switch plate.

A clip for staying the body of the case 1 to the steering post 10 and for aiding in supporting the rods 11 and 12 comprises a section 65 and a section 66 secured together by bolts and nuts, as at 67, in encircling relation to the steering post 10 and tube 13. The section 65 is secured to the rear wall 4 and to the dash board 9 by certain of the bolts and nuts 14—15 and the section 65 has openings through which the rods 11 and 12 extend.

Obviously, our invention is susceptible of embodiment in forms other than that illustrated in the accompanying drawing, and we therefore consider as our own all such modifications and adaptations of the form of the device herein described as fairly fall within the scope of the appended claims.

We claim:

1. In an automobile lock, a supporting structure attachable to the dash board of an automobile and having openings through which the usual throttle control rods of the automobile may extend, latch arms secured to said control rods adjacent to said supporting structure and a slide plate supported on said supporting structure for movement to and from position to engage with said latch arms to hold said control rods in positions to prevent starting of the automobile engine, and means for locking said slide plate to said supporting structure.

2. In an automobile lock, a supporting structure attachable to the dash board of an automobile and having openings through which the usual throttle control rods of the automobile may extend, latch arms secured to said control rods adjacent to said supporting structure, and a slide plate supported on said supporting structure for movement to and from position to engage with said latch arms to hold said control rods in positions to prevent starting of the automobile engine, means for locking said slide plate to said supporting structure, and means for staying said supporting structure and said control rods to each other and to the steering column of the automobile.

3. A locking device for automobiles comprising a case attachable to the dash board of an automobile and having openings in certain walls thereof through which the steering post of the automobile and the fuel throttle control rod and the spark control rod of the automobile may extend, a supporting plate in said case, a latch plate slidably supported on said supporting plate, arms on said fuel throttle and spark control rods extending in the path of movement of said slide plate, said slide plate having a notch in an edge thereof for engaging with said latch arms when said slide plate has been moved as far as possible in one direction on the supporting plate, and means for operating said slide plate.

4. A locking device for automobiles comprising a case attachable to the dash board of an automobile and having openings in certain walls thereof through which the steering post of the automobile and the fuel throttle control rod and the spark control rod of the automobile may extend, a supporting plate in said case, latch plate slidably supported on said supporting plate, arms on said fuel throttle and spark control rods extending in the path of movement of said slide plate, said slide plate having a notch in an edge thereof for engaging with said latch arms when said slide plate has been moved as far as possible in one direction on the supporting plate, and a rod connected to said slide plate and extending through aligned openings in a wall of said case and said dash board.

5. An automobile lock comprising a case attachable to the dash board of an automobile underneath the hood, a supporting plate within said case, a slide plate having limited guided movement on said supporting plate, said slide plate having an aperture, a post on said supporting plate extending through said aperture, a rod rotatably supported on said slide plate above said post and extending through an opening in said dash board, said rod being operable to slide said slide plate on its supporting plate, an angular lock bolt carried by said rod and having an arm depending alongside of said post and a second arm extending laterally of said slide plate, said post having a notch in the side thereof which is proximate to said first named arm of the lock bolt, and a series of tumblers having notches in their peripheries adapted when in alignment to receive the free end portion of the second named arm of the lock bolt so that sliding movement of the slide plate on its supporting plate will be permitted and adapted when the notches in the periphery thereof are disaligned to hold the first named arm of the lock bolt in the notch in said post and to then prevent movement of the slide plate in one direction on said supporting plate.

6. An automobile lock comprising a case attachable to the dash board of an automobile underneath the hood, a supporting plate within said case, a slide plate having limited guided movement on said supporting plate, said slide plate having an aperture, a post on said supporting plate extending through said aperture, a rod rotatably supported on said slide plate above said post and extending through an opening in said dash board, said rod being operable to slide said slide plate on its supporting plate, an angular lock bolt carried by said rod and having an arm depending alongside of said post and a second arm extending laterally of said slide plate, said post having a notch in the side thereof which is proximate to said first named arm of the lock bolt, arms on the fuel throttle and spark control rods of the automobile adapted to be engaged and retained by said slide plate in positions to prevent starting of the automobile engine when said slide plate is in one position on said supporting plate, and a series of tumblers having notches in their peripheries adapted when in alignment to receive the free end portion of the second named arm of the lock bolt so that sliding movement of the slide plate on its supporting plate will be permitted and adapted when the notches in the periphery thereof are disaligned to hold the first named arm of the lock bolt in the notch in said post and to then prevent movement of the slide plate from position to engage with said arms on the control rods.

ANDREW NORBERG.
LOUIS B. LODMELL.